US010015634B2

(12) United States Patent
MacDonald et al.

(10) Patent No.: US 10,015,634 B2
(45) Date of Patent: *Jul. 3, 2018

(54) METHODS AND APPARATUS FOR MOBILE STATION LOCATION ESTIMATION

(71) Applicant: AT&T Mobility II LLC, Atlanta, GA (US)

(72) Inventors: Alan Denis MacDonald, Bellevue, WA (US); Marc W. Sather, Kingston, WA (US); John Lawrence Snapp, Bellevue, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/256,676

(22) Filed: Sep. 5, 2016

(65) Prior Publication Data

US 2017/0006427 A1    Jan. 5, 2017

Related U.S. Application Data

(63) Continuation of application No. 14/217,571, filed on Mar. 18, 2014, now Pat. No. 9,439,167, which is a
(Continued)

(51) Int. Cl.
*H04W 24/00* (2009.01)
*H04W 4/02* (2018.01)
(Continued)

(52) U.S. Cl.
CPC .......... *H04W 4/026* (2013.01); *G01S 5/0252* (2013.01); *H04B 17/318* (2015.01); *H04L 43/16* (2013.01);
(Continued)

(58) Field of Classification Search
CPC ......... H04W 4/22; H04W 64/00; H04W 4/02; H04W 48/04; H04L 29/08657; H04M 1/72572
See application file for complete search history.

(56) References Cited

U.S. PATENT DOCUMENTS 5,293,642 A    3/1994 Lo
5,293,645 A    3/1994 Sood
(Continued)

FOREIGN PATENT DOCUMENTS

EP    0631453    12/1994
EP    0892278    1/1999
(Continued)

OTHER PUBLICATIONS

International Search Report dated Dec. 11, 2002 in International Application No. PCT/US2002/010791.
(Continued)

*Primary Examiner* — Steve D Agosta
(74) *Attorney, Agent, or Firm* — Hartman & Citrin LLC

(57) ABSTRACT

Methods and apparatus for estimating mobile station location include receiving reported signal strengths or other attachment indicator values from a mobile station. The reported signal strengths are compared with characteristic received signal strength values in a coverage area of a mobile network. A mobile switching center determines if a local function is requested and initiates a location estimation process by a mobile location module (MLM). The MLM receives the reported signal strength contours associated with the attachment points. Based on a comparison of the reported attachment indicator values with characteristic values, the MLM provides a mobile location estimate.

14 Claims, 11 Drawing Sheets

Related U.S. Application Data continuation of application No. 13/691,031, filed on Nov. 30, 2012, now Pat. No. 8,676,231, which is a continuation of application No. 13/334,341, filed on Dec. 22, 2011, now Pat. No. 8,369,870, which is a continuation of application No. 12/396,372, filed on Mar. 2, 2009, now abandoned, which is a continuation of application No. 10/473,926, filed as application No. PCT/US02/10791 on Apr. 3, 2002, now Pat. No. 7,519,372.

(60) Provisional application No. 60/281,147, filed on Apr. 3, 2001.

(51) Int. Cl.
  *G01S 5/02* (2010.01)
  *H04W 64/00* (2009.01)
  *H04B 17/318* (2015.01)
  *H04L 12/26* (2006.01)
  *H04W 4/22* (2009.01)
  *H04W 88/14* (2009.01)

(52) U.S. Cl.
  CPC .............. *H04W 4/22* (2013.01); *H04W 64/00* (2013.01); *H04W 64/003* (2013.01); *H04W 88/14* (2013.01)

(56) References Cited

U.S. PATENT DOCUMENTS

| | | | |
|---|---|---|---|
| 5,479,482 A | 12/1995 | Grimes | |
| 5,508,707 A | 4/1996 | LeBlanc et al. | |
| 5,510,801 A | 4/1996 | Engelbrecht et al. | |
| 5,564,079 A | 10/1996 | Olsson | |
| 5,657,487 A | 8/1997 | Doner | |
| 5,670,964 A | 9/1997 | Dent | |
| 5,717,406 A | 2/1998 | Sanderford et al. | |
| 5,724,660 A | 3/1998 | Kauser et al. | |
| 5,732,354 A | 3/1998 | MacDonald | |
| 5,945,948 A | 8/1999 | Buford et al. | |
| 5,974,329 A | 10/1999 | Wylie et al. | |
| 5,999,126 A | 12/1999 | Ito | |
| 6,006,077 A | 12/1999 | Shull | |
| 6,140,964 A | 10/2000 | Suglura et al. | |
| 6,233,445 B1 * | 5/2001 | Boltz .................. | H04W 4/22 379/45 |
| 6,236,365 B1 | 5/2001 | LeBlanc et al. | |
| 6,266,534 B1 | 7/2001 | Raith et al. | |
| 6,266,614 B1 * | 7/2001 | Alumbaugh ....... | G01C 21/3644 701/468 |
| 6,269,246 B1 | 7/2001 | Rao et al. | |
| 6,393,294 B1 | 5/2002 | Perez-Breva et al. | |
| 6,549,625 B1 * | 4/2003 | Rautila ................. | G01S 5/0045 380/258 |
| 6,654,689 B1 | 11/2003 | Kelly et al. | |
| 6,748,008 B2 | 6/2004 | Mesecher | |
| 6,799,046 B1 | 9/2004 | Tang | |
| 7,764,231 B1 | 7/2010 | Karr et al. | |

FOREIGN PATENT DOCUMENTS

| | | |
|---|---|---|
| WO | WO 98/15149 | 4/1998 |
| WO | WO 00/18148 | 3/2000 |
| WO | WO 01/28272 | 4/2001 |

OTHER PUBLICATIONS

U.S. Office Action dated Jul. 23, 2013 in U.S. Appl. No. 13/691,031.
U.S. Notice of Allowance dated Oct. 25, 2013 in U.S. Appl. No. 13/691,031.
U.S. Office Action dated Mar. 5, 2012 in U.S. Appl. No. 13/334,341.
U.S. Office Action dated Jun. 12, 2012 in U.S. Appl. No. 13/334,341.
U.S. Notice of Allowance dated Oct. 3, 2012 in U.S. Appl. No. 13/334,341.
U.S. Office Action dated Jan. 3, 2011 in U.S. Appl. No. 12/396,372.
U.S. Office Action dated May 12, 2011 in U.S. Appl. No. 12/396,372.
U.S. Office Action dated Jun. 27, 2011 in U.S. Appl. No. 12/396,372.
U.S. Office Action dated Oct. 13, 2005 in U.S. Appl. No. 10/473,926.
U.S. Office Action dated Mar. 29, 2006 in U.S. Appl. No. 10/473,926.
U.S. Office Action dated Jun. 21, 2006 in U.S. Appl. No. 10/473,926.
U.S. Office Action dated Nov. 6, 2008 in U.S. Appl. No. 10/473,926.
U.S. Office Action dated Jul. 9, 2007 in U.S. Appl. No. 10/473,926.
U.S. Office Action dated Nov. 1, 2007 in U.S. Appl. No. 10/473,926.
U.S. Advisory Action dated Jan. 17, 2008 in U.S. Appl. No. 10/473,926.
U.S. Office Action dated May 2, 2008 in U.S. Appl. No. 10/473,926.
U.S. Office Action dated Sep. 18, 2008 in U.S. Appl. No. 10/473,926.
U.S. Notice of Allowance dated Dec. 2, 2008 in U.S. Appl. No. 10/473,926.
U.S. Office Action dated May 29, 2015 in U.S. Appl. No. 14/217,571.
U.S. Office Action dated Oct. 8, 2015 in U.S. Appl. No. 14/217,571.
U.S. Notice of Allowance dated Jan. 15, 2016 in U.S. Appl. No. 14/217,571.
U.S. Notice of Allowance dated Apr. 26, 2016 in U.S. Appl. No. 14/217,571.

* cited by examiner

| CELL | SS |
|---|---|
| 1 | $RSSI_1$ |
| 2 | $RSSI_2$ |
| 3 | $RSSI_3$ |
| 4 | $RSSI_4$ |
| 5 | $RSSI_5$ |
| 6 | $RSSI_6$ |

METHODS AND APPARATUS FOR MOBILE STATION LOCATION ESTIMATION

CROSS-REFERENCE TO RELATED APPLICATIONS

This patent application is a continuation of and claims priority to U.S. patent application Ser. No. 14/217,571, filed Mar. 18, 2014, now U.S. Pat. No. 9,439,167, which is incorporated herein by reference in its entirety and which is a continuation of and claims priority to U.S. patent application Ser. No. 13/691,031, filed Nov. 30, 2012, now U.S. Pat. No. 8,676,231, which is incorporated herein by reference in its entirety and which is a continuation of and claims priority to U.S. patent application Ser. No. 13/334,341, filed Dec. 22, 2011, now U.S. Pat. No. 8,369,870, which is incorporated herein by reference in its entirety and which is a continuation of and claims priority to U.S. patent application Ser. No. 12/396,372, filed Mar. 2, 2009, now abandoned, which is incorporated herein by reference in its entirety and which is a continuation of and claims priority to U.S. patent application Ser. No. 10/473,926, filed Mar. 8, 2004, now U.S. Pat. No. 7,519,372, which is incorporated herein by reference in its entirety and which is a National Stage Entry of and claims priority to PCT/US02/10791, filed Apr. 3, 2002, which is incorporated herein by reference in its entirety and which claims priority to U.S. Provisional Application No. 60/281,147, filed Apr. 3, 2001, which is incorporated herein by reference in its entirety.

FIELD OF THE INVENTION

The present invention relates to methods and apparatus for determining the location of a mobile station in a wireless network.

BACKGROUND

Mobile telephone systems, also called cellular telephone systems, are becoming increasingly popular. These systems are generally made up of cell sites that are configured to serve an associated coverage area that is referred to as a cell. The cell site is a location within a cell at which communication hardware such as antenna(s) and radio base stations are installed. A mobile station operating within a particular cell in the system communicates with the mobile telephone system through the associated cell site. The cell sites are in communication with a mobile switching center that connects the mobile telephone system to a land-line telephone network.

One reason for the popularity of cell phones is that they can be used for emergencies. For example, a motorist could use the mobile telephone to call for assistance in case of a disabled vehicle. Many areas provide a special emergency cellular telephone number. In other areas, users can call 911, just as they would from a conventional land-line phone.

One of the problems with using the mobile telephone for emergencies stems from the mobility of the telephone. Public service providers, such as police, do not know the location of the mobile telephone calling the emergency number. In addition, users who call the emergency number often cannot provide enough location information to allow the public service provider to find them. Thus, it is desirable to provide a mobile telephone system that can determine the location of a mobile telephone and provide that information to public service providers.

Such a mobile telephone location service would be desirable in other contexts besides emergency responses. For example, a mobile telephone user who is lost may request location information from the mobile telephone system provider. The location information could be passed to the user from the system. Yet another user for such a system would be companies which operate fleets of vehicles. A home base for company operations could keep track of the locations of its vehicles by using a mobile telephone location service. Of course there are many other applications for such a service.

In known techniques for mobile telephone location, the distance between a mobile telephone and a mobile telephone system antenna in a cell site can be determined by analyzing the signal strength of a communication signal between the cell site antenna and the mobile telephone. If the distance between the mobile telephone and a number of cell site antennas is calculated, the approximate location of the mobile telephone can be determined by a geometric process such as triangulation.

U.S. Pat. No. 4,891,650 describes a vehicle location system which determines an approximate vehicle location using a cellular telephone system. The location function is initiated when a vehicle transmits an alarm signal to nearby cell sites. The cell sites receiving this alarm signal analyze the received alarm signal to determine its signal strength. The cell sites then send signal strength information through the mobile telephone system to an alarm central station. The alarm central station then uses the signal strengths reported from various cells to determine an approximate location of the vehicle. A more accurate location is achieved by sending out actual tracking vehicles to the approximate location calculated by the central station. A disadvantage of this system is that each of the cell sites requires additional components, which will generate and send an appropriate signal strength report message to a mobile telecommunications switching office. The mobile telecommunications switching office also needs special functionality to send appropriate information to a central tracking station that determines an approximate location of the vehicle using the signal strengths.

U.S. Pat. No. 5,218,367 describes a vehicle tracking system which uses signal strengths received from nearby cells to calculate an approximate vehicle location. In this system, a special purpose mobile telephone determines signal strengths being received from a nearby cell and generates and sends an appropriate alarm message, including signal strength information, to a central station via the mobile telephone system. The central station then uses this information to determine an approximate location of the vehicle. The system can improve upon the accuracy of the approximate location if the cells are divided into sectors and particular information about the antennas in these sectors is used. Once an approximate location is found, a more accurate location is achieved by sending out actual tracking vehicles to the approximate location calculated by the central station.

A technique described in U.S. Pat. No. 4,891,650 requires additional components in each of the cell sites in order to generate and send appropriate signal strength report messages. Since there are many such cells in a mobile telephone system, such additional components are undesirable. Thus, there is a need for a mobile telephone location system, which does not require additional components at each cell site. Other methods are described in U.S. Pat. No. 5,724,660 and U.S. Pat. No. 5,732,354.

Some of the location techniques described in the above patents do not calculate an accurate location of the mobile telephone. The accuracy of the location is improved by sending out actual tracking vehicles. However, the need for such vehicles makes such techniques very expensive. Improved methods and apparatus for mobile station location estimation are needed.

SUMMARY

Mobile station location methods include determining a geographical location based on reported signal strength (RSS) values reported by a mobile station. The RSS values are compared with sets of RSS values obtained by, for example, signal strength measurements or signal strength computations, and stored in a memory. According to representative examples, methods include establishing latitude or longitude coordinates with a global positioning system processor associated with the mobile station. Reported RSS values are compared with predetermined RSS values associated with the latitude and longitude coordinates. In additional examples, the predetermined sets of RSS values are revised based on GPS location coordinates reported by the mobile station.

Mobile station location processors include an input configured to receive attachment indicators associated with at least two points of attachment of the mobile station. A memory is configured to store sets of predetermined attachment indicators associated with the at least two points of attachment, and an estimation unit is configured to provide an estimate of the mobile station location based on a comparison of the received attachment indicators and at least one set of the at least two predetermined attachment indicators. According to additional examples, the received attachment indicator values are reported by the mobile station. In other examples, the attachment indicator values are reported by one or more points of attachment. In a representative example, the attachment indicator values are received signal strength values reported by the mobile station.

Mobile location modules include a processor configured to compare at least two reported received signal strength values with at least two predetermined received signal strength values associated with at least two geographical locations in a wireless network. The mobile location modules also include an output configured to deliver a mobile location estimate based on the comparison. According to representative examples, the processor is configured to determine a score associated with the comparison of the reported received signal strength values with the predetermined received signal strength values. In additional examples, the reported and received signal strength values relate to mobile-assisted hand-off.

Location units for estimating a geographic location of a mobile station include an input configured to receive attachment indicator values associated with a mobile station, and a processor configured to provide a mobile station location estimate based on predetermined attachment indicator contours associated with network attachment points. According to representative examples, the attachment indicator values are received signal strength values reported by the mobile station and the attachment indicator contours are received signal strength contours.

Methods of locating a mobile station include obtaining a set of received signal strength values associated with the mobile station and determining a mobile station location based on a comparison of the received signal strengths with characteristic signal strength values. In representative examples, the mobile station location is determined by selecting a location associated with the characteristic signal strength values associated with a selected error score. In other examples, the methods include storing the characteristic signal strength values and retrieving the characteristic values from a memory.

Methods of locating a mobile station within a geographic service area include obtaining attachment indicator values for the mobile station. The mobile station attachment indicator values are associated with a series of attachment points and are compared with characteristic attachment indicator values associated with the series of attachment points to obtain a mobile station location estimate. According to additional representative examples, the methods include reporting the estimated mobile station location. In other examples, the attachment indicator values for the mobile station are received signal strength values associated with corresponding radio base stations and reported by the mobile station. In representative examples, the mobile station attachment indicator values and the characteristic attachment indicator values are compared by determining scores, and the estimated mobile station location is selected based on the scores.

Methods of locating a mobile station include obtaining at least one of a latitude and a longitude location estimate based on a global positioning system. An estimate of mobile station location is provided based on a comparison of mobile station attachment indicator values with characteristic attachment indicator values in a region associated with the latitude and longitude estimates.

Methods of estimating a mobile station location include receiving signal strength values reported by a mobile station and associated with a plurality of antennas. A first location area of the mobile station is calculated as a geographic coverage area of a serving cell site and a second location area of the mobile station is calculated based on a comparison of the reported received signal strength values with predetermined signal strength values associated with at least one location in the geographic coverage area. According to representative examples, the predetermined signal strength values are represented as signal strength contours, and the mobile station location estimate is based on associating one or more signal strength contours with the reported received signal strength values.

Characteristic attachment indicator values can be determined based on a propagation characteristic between a geographic location and a point of attachment. In representative examples, the propagation characteristic can be propagation path slope, antenna pattern roll-off, or other value.

Networks configured to provide location estimates for a mobile station include a mobile location module that receives attachment indicator values associated with points of attachment. The network includes a database that includes characteristic attachment indicator values for geographic locations in a network service area. A mobile location estimate is provided based on a comparison of the received attachment indicator values and the characteristic attachment indicator values. In some examples, the received attachment indicator values are received signal strength values reported from the mobile station. In additional examples, the comparison is based on a calculated score associated with the characteristic attachment indicator values and the received attachment indicator values. In other examples, the characteristic attachment indicator values are configured as attachment indicator value contours, and the mobile station location estimate is based on these contours.

Computer readable media are provided that contain computer-executable instructions for determining mobile station location estimates. The media include computer-executable instructions configured to compare reported attachment indicator values with characteristic attachment indicator values associated with corresponding geographic locations. In some examples, instructions for determining the characteristic values are provided.

Methods of providing mobile location information include determining a mobile location based on a comparison of reported attachment indicator values with characteristic attachment indicator values associated with respective geographic locations. In some examples, the mobile location is reported to a service provider, and, in additional examples, the mobile location determination is repeated based on updated reported attachment indicator values to obtain an updated mobile location that is reported to the service provider.

These and other features are set forth below with reference to the accompanying drawings.

DETAILED DESCRIPTION

Figure 1:
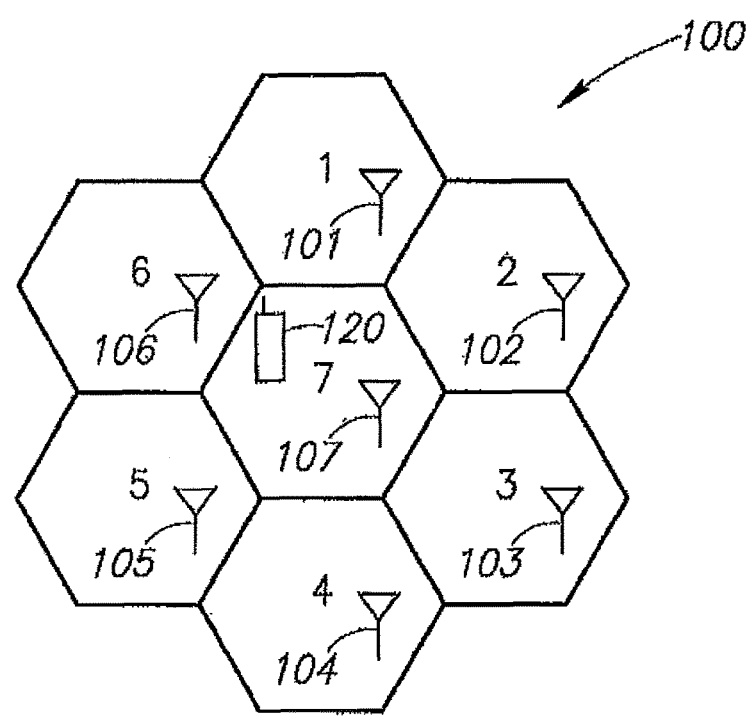
FIG. 1 illustrates a geographic service area of a wireless network.

FIG. 1 shows the geographic serving area 100 of a mobile telephone system. The serving area 100 is shown having 7 hexagonal cells numbered 1-7. Cell 7 is shown in the center, surrounded by adjacent cells 1-6. The serving area 100 of a mobile telephone system would typically contain more than 7 cells, however, for ease of reference, only 7 cells are shown in FIG. 1. Each cell 1-7 contains an antenna 101-107 which is used to transmit signals to and receive signals from mobile telephones such as a mobile telephone 120 within the mobile telephone system serving area 100.

Figure 2:
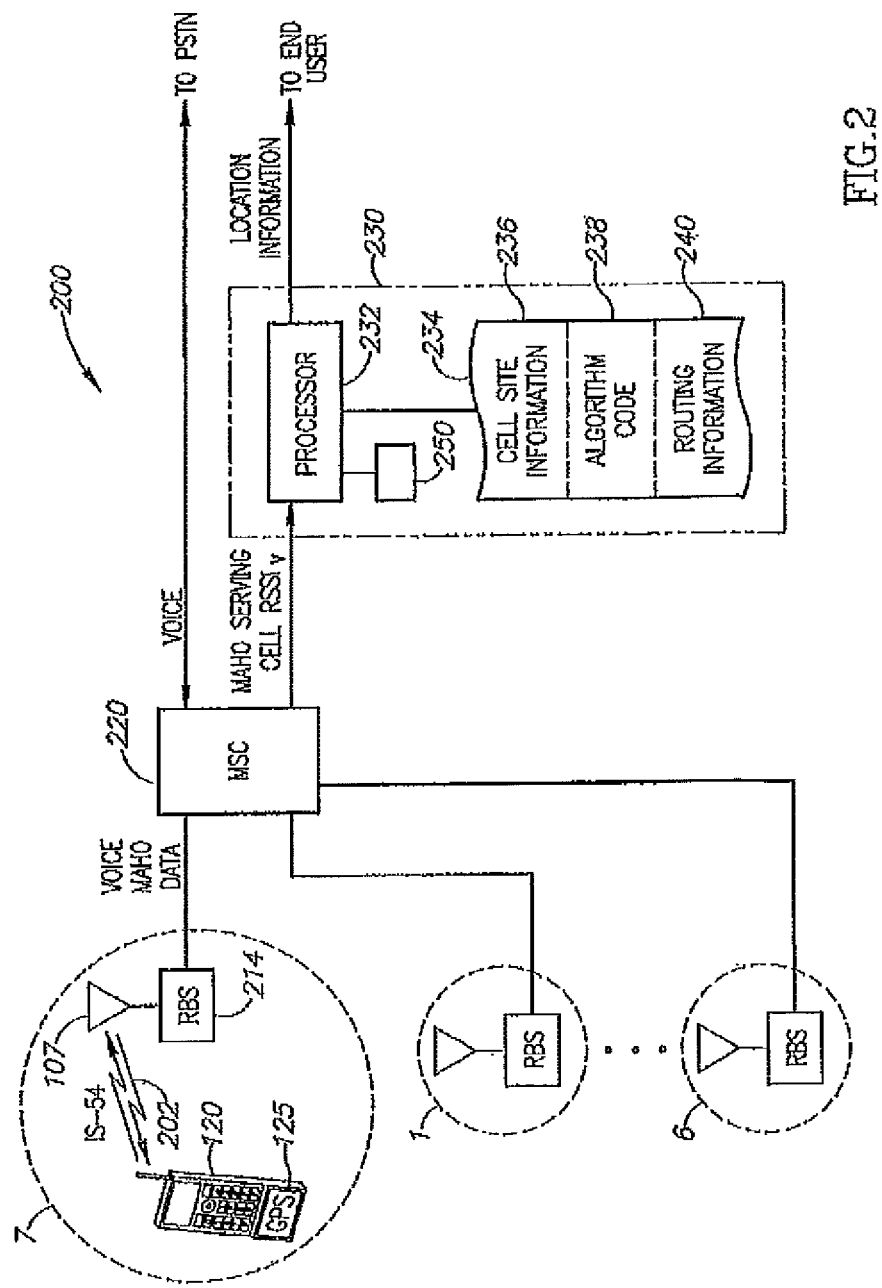
FIG. 2 is a block diagram illustrating a mobile telephone system.

A mobile telephone system 200 is shown in FIG. 2. Cell 7 is shown containing antenna 107 connected to a radio base station (RBS) 214. The mobile telephone 120 shown within cell 7 communicates with the mobile telephone system 200 via an air interface 202. For example, the mobile telephone 120 can be a digital mobile telephone that operates according to a North American time division multiple access (TDMA) system according to an IS-55 standard, and an air interface according to an IS-54 or IS-136 standard. See, for example, TIA/EIA Interim Standard IS-55-A "Recommended Minimum Performance Standards of 800 MHz Mode Mobile Stations," September 1993; EIA/TIA Interim Standard IS-54-B "Cellular System Dual-Mode Mobile Station-Base Station Compatibility Standard," April 1992; EIA/TIA Interim Standard IS-136 "Cellular System Dual-Mode Mobile Station-Base Station: Digital Control Channel Compatibility Standard," April 1995; which are incorporated by reference herein. In addition, a global positioning system (GPS) receiver/processor unit 125 can be provided in or otherwise associated with the mobile telephone 120 which is to be located. This use of the GPS receiver/processor 125 in the mobile telephone 120 will be described in further detail below. Cells 1-7 include respective antennas connected to associated radio base stations (RBS) that are in communication with the mobile switching center (MSC) 220.

The cells 1-7 are assigned a plurality of voice channels for transmitting and receiving voice signals and respective control channels for transmitting and receiving control data signals. Referring to FIGS. 1-2, consider mobile telephone 120, which is operating in cell 7. The mobile telephone 120 is communicating over the air interface 202 with the mobile telephone system 200 via antenna 107 and RBS 214. Voice signals are communicated between the mobile telephone 120 and the antenna 107 via one of the cell's voice channels, and control data signals are communicated between mobile telephone 120 and the antenna 107 via the cell's control channel. In such a situation, cell 7 is the serving cell since the voice data is being communicated through that cell. In addition to the communication with the serving cell, the mobile telephone 120 also monitors the control channels of nearby cells. The mobile telephone 120, for mobile-assisted hand-off in accordance with the IS-54 and IS-136 standards, measures the signal strengths of these control channels of nearby cells. These control channel signal strength measurements are sent to the MSC 220 as described in further detail below. In addition, the mobile telephone 120 measures the signal strength of the voice signal it is receiving from the serving cell site antenna. This voice channel signal strength measurement is periodically sent by the mobile telephone 120 to the MSC 220 via the serving cell's reverse voice channel.

As the mobile telephone 120 travels within the geographic serving area 100, the signal strength of the voice channel signal between the antenna 107 and the mobile telephone 120 will vary. As the mobile telephone 120 enters another cell such as, for example, adjacent cell 5, the signal strength of the control channel signal from antenna 105 will become stronger than the signal strength of the voice channel signal from antenna 107. At this point, it is desirable for the mobile telephone 120 to terminate communication over the voice channel with cell 7 and to initiate communication via a voice channel of cell 5. This operation is called hand-off, and is used to change the serving cell while the mobile telephone 120 is traveling within the geographic serving area 100 so that the mobile telephone 120 maintains voice channel communication via the antenna with the strongest signal.

Figures 3, 4:
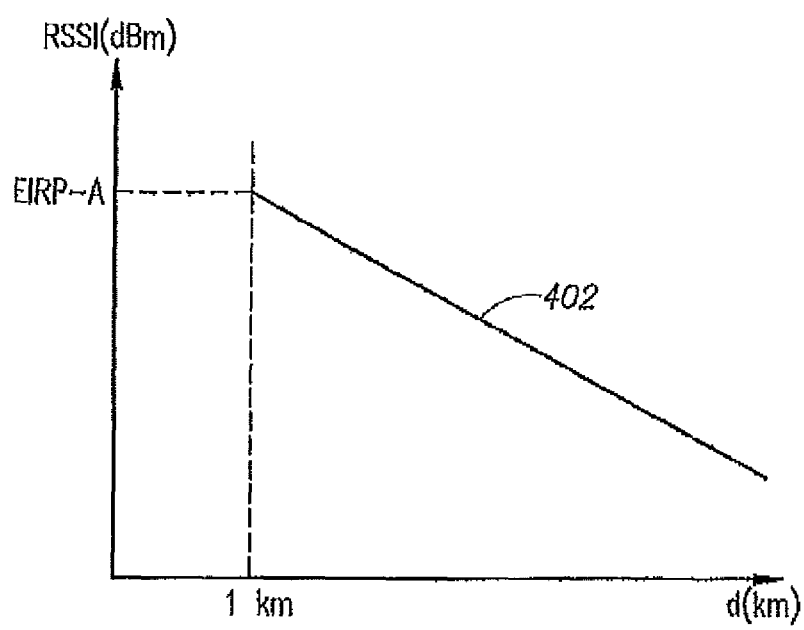
FIG. 3 shows an example mobile-assisted hand-off (MAHO) list that includes received signal strengths.
FIG. 4 illustrates a Hata propagation loss model.

In mobile telephones based on the IS-54 and IS 136 air protocols, this hand-off operation is assisted by the mobile telephone itself. Such a function is called mobile-assisted hand-off (MAHO). The mobile telephone 120 maintains a MAHO list, which contains the signal strengths of the signals that the mobile telephone 120 is receiving over the control channels of nearby cells. Each cell site has a predefined MAHO list. The MSC 220 stores these MAHO lists for each cell site and sends the appropriate list to the mobile telephone 120, depending on the serving cell site. These defined MAHO lists generally consist of the cells adjacent to the serving cell. For example, assuming that cell 7 is the serving cell, an example MAHO list 300 is shown in FIG. 3. The list of channels to measure and to include in the MAHO list is communicated to the mobile telephone 120 by the MSC 220. The list 300 contains an entry for each of the adjacent cells 1-6 in this illustration, with a corresponding signal strength (RSSI) which represents the signal strengths of the control channels broadcast by cells 1-6 as received by mobile telephone 120. Thus, $RSSI_1$ represents the control channel signal strength being received by the mobile telephone 120 from the antenna 101 in cell 1; $RSSI_2$ represents the control channel signal strength being received by the mobile telephone 120 from the antenna 102 in cell 2; etc.

MAHO measurements are periodically sent from the mobile telephone 120 to the MSC 220 via the serving cell's reverse voice channel. The contents of the MAHO list are determined by the IS-54 standard, and thus all digital mobile telephones, which comply with this air protocol, will maintain a MAHO list.

It is often desirable to determine a specific geographic location of a mobile telephone such as the mobile telephone 120 within the geographic serving area 100. A mobile location module (MLM) 230 can be included in the mobile telephone system 200 to provide a mobile station location. The MLM 230 includes a processor 232 and a memory 234. The MLM 230 is connected to the MSC 220, and the location function of the MLM 230 can be initiated by the MSC 220 as follows.

Upon initiation of a telephone call by the mobile telephone 120, the RBS 214 sends the MSC 220 the telephone number of the mobile telephone (the A number) and the telephone number of the telephone being called by the mobile telephone (the B number). The MSC 220 can be configured to perform an A/B number analysis to determine whether a location function is to be performed. For example, the MSC 220 can initiate the location function each time a mobile telephone dials 911. In addition, the mobile telephone system provider can offer this location function as a service to its customers. In this situation, if the user of the mobile telephone 120 dials a certain number, the MSC 220 can initiate the location function and the location of the mobile telephone could be communicated to the mobile telephone user. Further, the MSC 220 can determine whether a location function is requested by referring to a user profile stored in the MSC 220. For example, a company that uses a fleet of vehicles may want a location function performed each time a call is initiated from one of its mobile telephones. As seen by these examples, by performing an A/B number analysis, the MSC 220 can initiate a location function based on various criteria. One skilled in the art would recognize that various other A/B number analyses could be performed to determine whether initiation of the location function is requested. If the MSC 220 determines, that a location function is requested, a location function in the MLM 230 is requested. Whether or not a location function is initiated, the voice portion of the signal can be sent to the appropriate destination. For example, if the mobile telephone 120 called a land line telephone, then the voice signal can be sent to the public switch telephone network (PSTN). Thus, calls that result in the initiation of a location function do not need to terminate at the MLM 230. Voice information may be transmitted to the appropriate location based upon the number dialed.

In one example, the location of a mobile telephone 120 within the geographic service area 100 can be determined by the MLM 230 as follows. The MSC 220 passes the following information to the MLM 230. The MAHO list 300 containing the $RSSI_{1-6}$ is sent by the mobile telephone 120. The cell site currently serving the mobile telephone 120 is identified. The signal strength of the voice channel signal from the serving cell site, represented as ($RSSI_V$), is measured and sent by the mobile telephone 120.

The MLM processor 232 then executes computer program code 238 stored in memory 234. The computer program code 238 describes the location algorithm to be performed by the processor 232. This algorithm is shown in the flow diagram of FIG. 10. The first step 1002 is to calculate two location zones, zone 1 and zone 2. Zone 1 is defined by the geographic coverage area of the cell currently serving the mobile telephone 120. For example, if the serving cell was cell 7 (see FIG. 1) then zone 1 would be the geographic coverage area included in cell 7. Zone 2 is calculated by the MLM 230 as described below in conjunction with FIGS. 4-8.

The first step in calculating zone 2 is to evaluate $RSSI_V$ and $RSSI_{1-6}$ to determine the three strongest signal strengths. For the present example, assume that cell 7 is the serving cell and the strongest signal strengths are the voice channel signal strengths ($RSSI_V$) being communicated over antenna 107, the signal strength associated with the control channel for cell 2 ($RSSI_2$) being communicated over antenna 102, and the signal strength associated with the control channel for cell 4 ($RSSI_4$) being communicated over antenna 104. Using these signal strengths, it is possible to estimate the distance of the mobile telephone 120 from each of the antennas 102, 104, 107 using the following equation:

$$\text{RSSI (dBm)} = \text{EIRP (dBm)} - \text{Propagation Loss (dB)} \qquad (1)$$

In the above equation, RSSI is the known signal strength being received by a mobile telephone from an antenna. EIRP is the effective isotropic radiated power of the antenna, and it depends on the power of the transmitter (TxPower) and the gain of the antenna (Antenna Gain), such that EIRP (dBm)= TxPower (dBm)+Antenna Gain (dBi). For each antenna 102, 104, 107, the TxPower (dBm) and the Antenna Gain (dBi) are fixed constants and thus the EIRP for each of the antennas is a known value. See, for example, C. A. Belanis, *Antenna Theory Analysis and Design*, John Wiley & Sons, New York, 1982.

The second term of equation (1), Propagation Loss, is modeled based upon the Hata model, which is illustrated in FIG. 4. The model is of the form:

$$\text{Propagation Loss (dB)} = A + B \log d,$$

wherein A is the 1 km intercept point which depends on the height of the antenna and the frequency being transmitted and includes a component which is due to the antenna height above the ground. B is the propagation path slope, and d is the distance of the mobile telephone from the antenna (in kilometers). As shown in FIG. 4, EIRP (dBm)-A is the RSSI value of the line 402 at d=1 km, and B is the slope of the line at 402. For further information on the Hata model see, M. Hata, "Empirical Formula for Propagation Loss in Land Mobile Radio Services," IEEE Trans. Vehicular Tech. Vol. VT-29 (August 1980).

Thus, equation (1) becomes:

$$RSSI = EIRP - (A + B \log d) \quad (2)$$

Solving for distance d:

$$d = 10^{1/B[EIRP-RSSI-A]} \quad (3)$$

In equation (3), EIRP is a known constant for each of the cell site antennas; the RSSI value is known based on measurements made by the mobile telephone 120 and the 1 km intercept point, A, is a known constant depending on the height of the antenna and the frequency being transmitted. Thus, the only unknown in equation (3) is the propagation path slope B. It is known that B is environment dependent and is generally bound as:

20 dB/dec (line of sight) < B < 45 dB/dec (heavy urban).

Typically, propagation path slope is given in terms of terrain and building density. Typically categories are: Suburban: B=30, Urban: B=35, and Downtown: B=40. Thus, by estimating the value of B for each antenna, the distances $d_2$, $d_4$, and $d_7$ of the mobile telephone 120 from antennas 102, 104, 107 respectively, can be calculated as follows:

$$\log(d_2) = \frac{1}{B_2}[EIRP_2 - RSSI_2 - A_2]$$

$$\log(d_4) = \frac{1}{B_4}[EIRP_4 - RSSI_4 - A_4]$$

$$\log(d_7) = \frac{1}{B_7}[EIRP_7 - RSSI_7 - A_7]$$

wherein $EIRP_n$ is the effective isotropic radiated power of the antenna in cell n, $A_n$ is the 1 km intercept point between the mobile telephone 120 and cell n, and B is the estimated propagation path slope of the environment in cell n.

Figure 5:
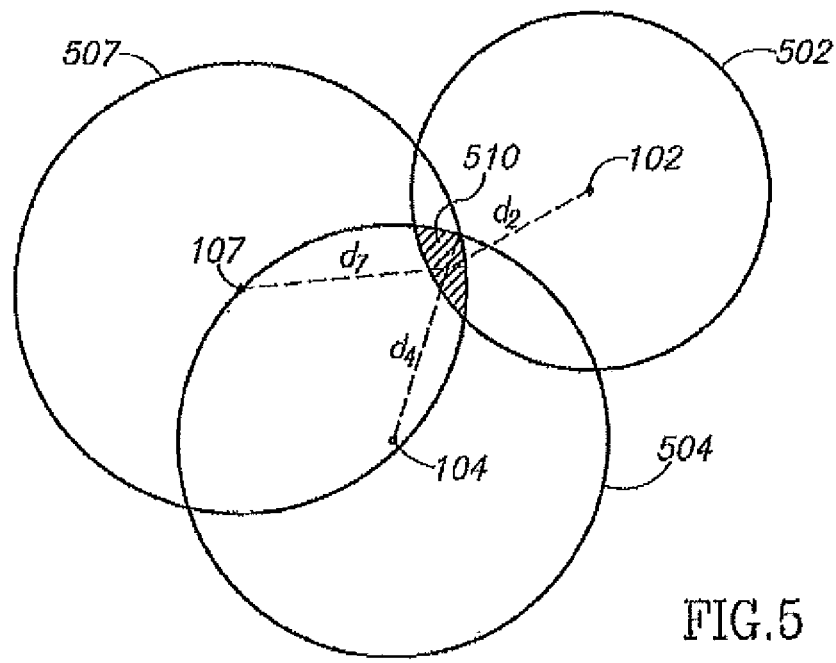
FIG. 5 illustrates a location area as an intersection of circles, wherein radii of the circles are overestimates of mobile station distances.

After the distances $d_2$, $d_4$, and $d_7$ are calculated, a location area is determined by plotting the following circles, as illustrated in FIG. 5:

a circle 502 of radius $d_2$ centered at antenna 102;
a circle 504 of radius $d_4$ centered at antenna 104; and
a circle 507 of radius $d_7$ centered at antenna 107.

The intersection area 510 of circles 502, 504, 507 estimates the location of the mobile telephone 120 within the geographic serving area 100. Since the values or $B_2$, $B_4$ and $B_7$ are estimates, the resulting distances $d_2$, $d_4$ and $d_7$ will have a certain error component based upon the estimate of B. The calculated distances $d_2$, will have other error components as well, based upon cell characteristics other than propagation path slope. Examples of such cell characteristics are the relative height of the mobile telephone to each cell site antenna and the gain reduction due to antenna pattern roll off. The algorithm described herein does not take these other error components into account. In FIG. 5, $d_2$, $d_4$ and $d_7$ are overestimates of the distance of the mobile telephone 120 from each of the antennas 102, 104 and 107, and thus the resulting location can only be determined to be within area 510.

It is also possible that the resulting distances, $d_2$, $d_4$ and $d_7$ would be underestimates of the distance of the mobile telephone 120 from each of the antennas 102, 104 and 107.

Figure 6:
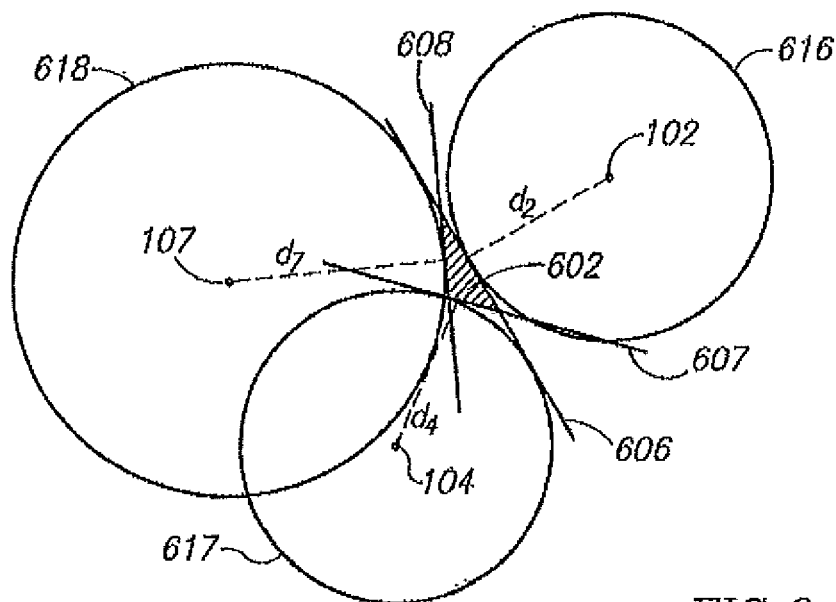
FIG. 6 illustrates a location area as an intersection of circles, wherein radii of the circles are underestimates of mobile station distances.

Such a case is illustrated in FIG. 6, in which the location estimate is within area 602. The area 602 is delimited by drawing the three lines 606, 607 and 608, which are tangent to the circles 616, 617 and 618 respectively. These three line 606, 607 and 608 are adjusted such that they define a triangle of reduced area. The area defined by such a triangle is the location estimate area shown in FIG. 6 as area 602.

Figure 7:
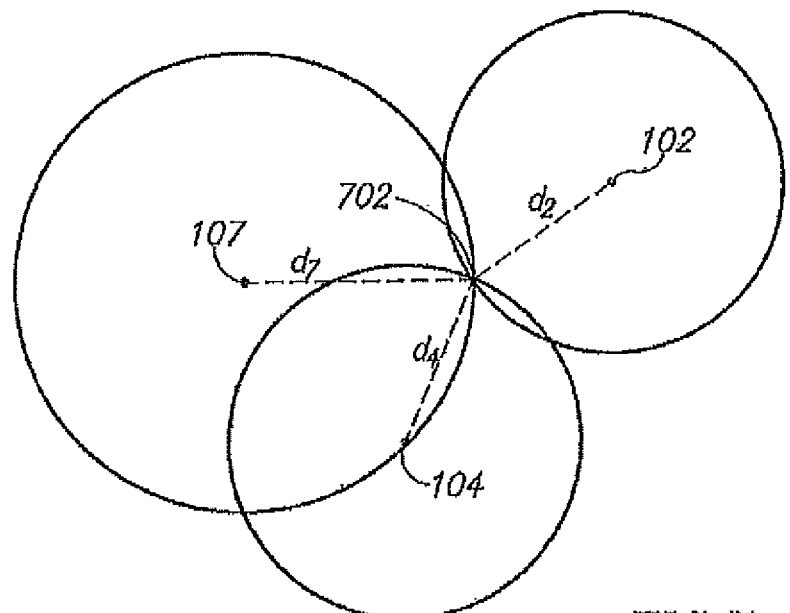
FIG. 7 illustrates a location point as an intersection of circles, wherein radii of the circles are accurate estimates.

If the resulting distances $d_2$, $d_4$ and $d_7$ are accurate estimates of the distance of the mobile telephone 120 from each of the antennas 102, 104 and 107, then the drawn circles would intersect at a point. Such a case is illustrated in FIG. 7, in which the location estimate is shown as point 702.

Since the only variable in the distance equation is the propagation path slope B, it is possible to improve the accuracy of the location estimate by varying the estimates or $B_2$, $B_4$ and $B_7$ to reduce the error component of the calculated distances $d_2$, $d_4$ and $d_7$.

Figure 8:
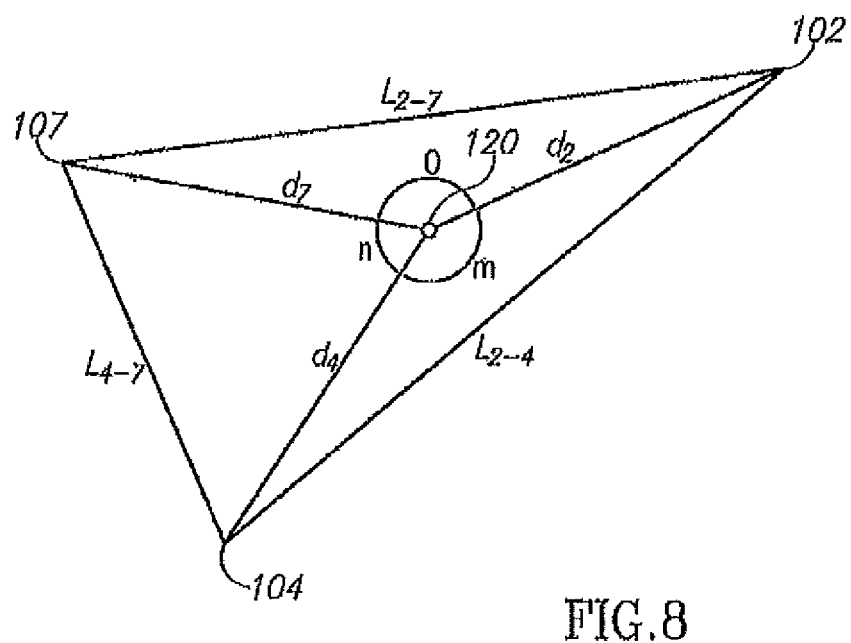
FIG. 8 illustrates a method of reducing error components of computed distances.

The basis for this technique is illustrated in FIG. 8. Lines which represent the distance between antennas 102, 104, and 107 are drawn. Line $L_{2-7}$ represents the distance between antennas 102 and 104. Line $L_{4-7}$ represents the distance between antennas 104 and 107. The lengths of lines $L_{2-4}$, $L_{2-7}$ and $L_{4-7}$ are known because the locations (in latitude and longitude coordinates) of the cell site antennas are known. As before, the lines $d_2$, $d_4$ and $d_7$ represent the calculated distances of the mobile telephone 120 from each of the antennas 102, 104 and 107, respectively. The angles m, n, and o can be obtained as functions of the distances $d_2$, $d_4$, $d_7$ from the following expressions based on the law of cosines:

$$L_{2-4} = d_2^2 + d_4^2 - 2d_2 d_4 \cos(m)$$

$$L_{2-7} = d_2^2 + d_7^2 - 2d_2 d_7 \cos(o)$$

$$L_{4-7} = d_4^2 + d_7^2 - 2d_4 d_7 \cos(n)$$

Referring again to FIG. 8, the sum of the angles m, n, and o is 360 degrees so that $360 - (\angle m + \angle n + \angle o) = 0$.

The calculation of the distances $d_2$, $d_4$ and $d_7$ tends to be most accurate when each of these angles is positive and the sum of the angles is 360 degrees. The only variables in the calculations of $d_2$, $d_4$ and $d_7$ are the propagation path slopes $B_2$, $B_4$ and $B_7$, respectively, which values are generally between about 20 dB/dec and 45 dB/dec. Thus, the values $d_2$, $d_4$ and $d_7$ are calculated using equations 4, 5 and 6 while varying the propagation path slopes $B_2$, $B_4$ and $B_7$ between 20 dB/dec and 45 dB/dec. The resulting distances $d_2$, and $d_4$ and $d_7$ are then used to evaluate the sum of angles m, n, and o. The values of $d_2$, and $d_4$ and $d_7$ for which the sum is closest to 360 with all its terms positive gives values for $d_2$, and $d_4$ and $d_7$ with reduced error components.

When the distances $d_2$, $d_4$, and $d_7$ with reduced error components are found, the location area of the mobile telephone 120 is determined by plotting appropriate circles as described above. The geographic location (i.e. latitude and longitude) of antennas 102, 104, 107 in the geographic serving area 100 are known and, in one embodiment, are stored as cell site-information 236 in the memory 234 of the MLM 230. The MLM 230 uses these known cell site locations to determine the geographic location of the estimated location area by, for example, plotting the estimated location area on a map. This calculated location area is the zone 2 location. The MLM 230 can also include a database 250 configured to provide sets of RSS values corresponding to mobile station locations in the geographic service area of the network.

As discussed above, a GPS receiver/processor unit 125 can be used as a component in the mobile telephone 120 which is to be located. As is well known in the art, a GPS receiver/processor receives signals from satellites orbiting the earth and translates these signals into latitude and longitude coordinates of the position of the GPS receiver/processor. A typical GPS receiver/processor is accurate to within approximately 50 feet. The MLM 230 uses information provided by the GPS receiver in the mobile telephone 120 to increase the accuracy of the geographic location estimate.

Figure 9:
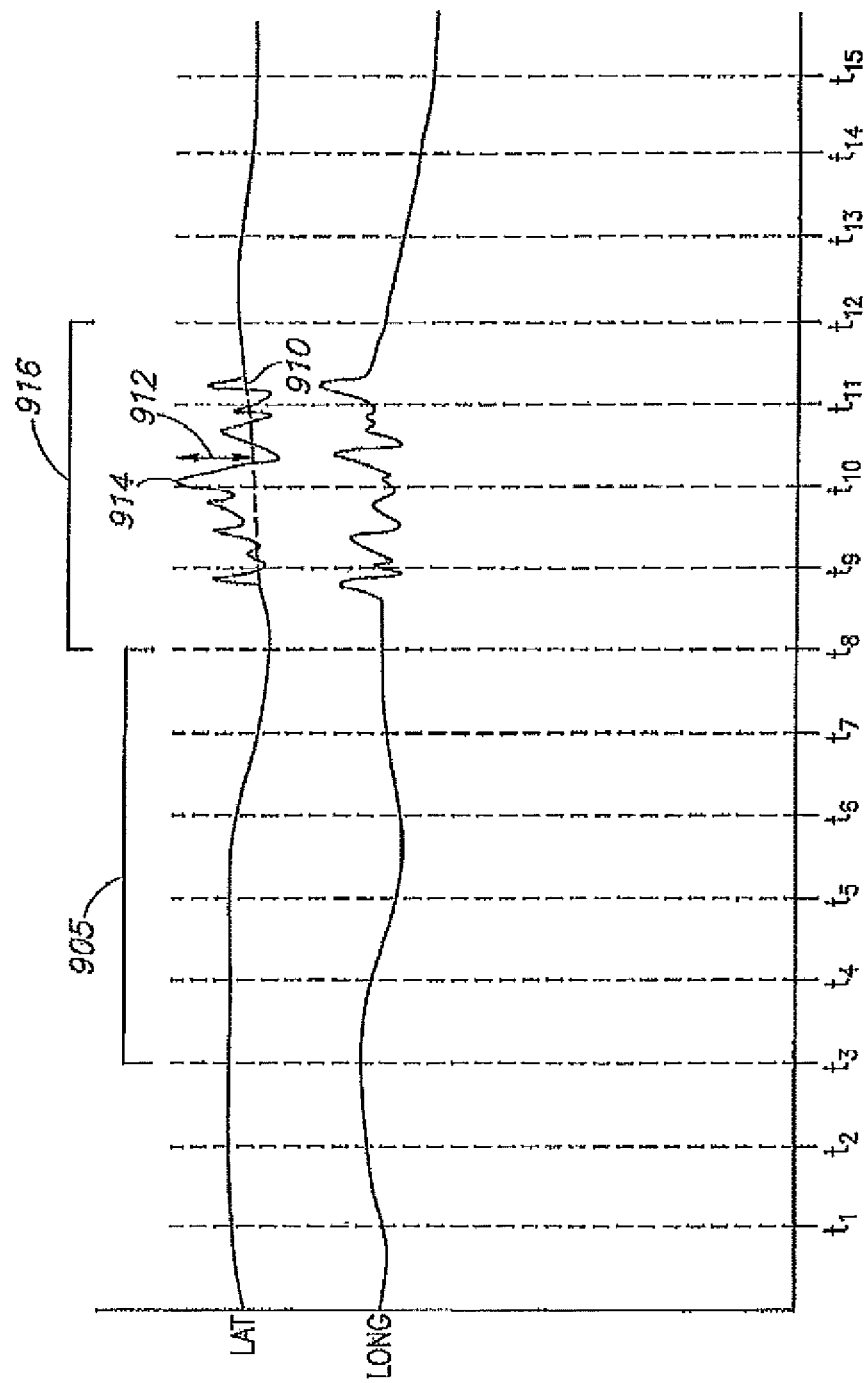
FIG. 9 is a graph of latitude and longitude coordinates calculated by a GPS receiver/processor over a time interval.

A known problem with GPS receivers is that location accuracy requires line of sight communication with multiple satellites and do not return accurate latitude and longitude coordinates if a line of sight to the satellite receivers is blocked. For example, GPS receivers typically do not report accurate coordinates when located inside a building or in wooded areas. This limitation can be compensated using the last GPS coordinate position which is within a predefined confidence level. This is accomplished by using a calculated average latitude and longitude position, along with a latitude and longitude error as follows:

FIG. 9 shows a graph of the latitude and longitude coordinates calculated by a GPS receiver/processor 125 over time intervals ($t_{1-15}$). At each time interval $t_n$, the GPS receiver/processor 125 calculates the current coordinates of the mobile telephone 120. At time $t_n$ the latitude coordinate is represented by $Lat(t_n)$ and the longitude coordinate is represented by $Long(t_n)$. The coordinates $Lat(t_n)$ and $Long(t_n)$ calculated by the GPS receiver/processor 125 will generally vary smoothly over time. However, if the line of sight to the satellites is blocked, for example, if the mobile telephone 120 enters a building, the calculated coordinates will not be accurate. This is illustrated in FIG. 9 at intervals $t_{8-12}$.

The GPS receiver/processor 125 is configured to compute the average of the latitude and longitude coordinates over a predetermined sliding time window, where the average latitude and longitude for the window ending at time period $t_n$ is represented as $Lat\_Avg(t_n)$ and $Long\_Avg(t_n)$ respectively. The length of the sliding time window is programmed into the GPS receiver/processor 125 and can vary depending on, for example, the desired accuracy and/or particular application. If this sliding time window is defined as N time periods, then the average latitude and a longitude coordinates $Lat\_Avg(t_n)$ and $Long\_Avg(t_n)$, respectively, for the time window ending at $t_n$ is an average of N latitude coordinates and N longitude coordinates associated with times $t_{N+1} \ldots t_n$.

The values of $Lat\_Avg(t_n)$ and $Long\_Avg(t_n)$ can be continuously computed by the GPS receiver/processor 125 at successive time periods. For example, if the time period of the sliding time window N is set to 5 time periods, then the time window ending at time period $t_8$ is shown in FIG. 9 at 905. The values of $Lat\_Avg(t_8)$ and $Long\_Avg(t_8)$ would be calculated by the GPS receiver/processor 125 at time $t_8$ as averages of 5 values associated with times $t_4, \ldots, t_8$.

In addition to the average coordinates, the GPS receiver/processor 125 also calculates a peak error of the latitude and longitude coordinates during the time window. The peak error for the latitude coordinate for the time window ending at time $t_n$ is represented as $Error\_Lat(t_n)$, and the peak error for the longitude coordinate for the time window ending at time $t_n$ is represented as $Error\_Long(t_n)$. These peak errors are calculated by comparing the instantaneous latitude and longitude coordinates for each time period during the time window with the average coordinates of the time window, as follows:

$$Error\_Lat(t_n) = \max\{|Lat_{n-N+1} \ldots n - (Lat\_Avg(t_n))|\}$$

$$Error\_Long(t_n) = \max\{|Long_{n-N+1} \ldots n - (Long\_g\_Avg(t_n))|\}$$

For example, to calculate the peak error for the time window ending at time $t_8$, the calculation would be:

$$Error\_Lat(t_8) = \max\{|Lat_4 \ldots 8 - (Lat\_Avg(t_8))|\}$$

$$Error\_Long(t_8) = \max\{|Long_4 \ldots 8 - (Long\_Avg(t_8))|\}$$

Thus, the instantaneous latitude coordinates $Lat(t_4)$, $Lat(t_5)$, $Lat(t_6)$, $Lat(t_7)$, and $Lat(t_8)$, are compared with $Lat\_Avg(t_8)$, and the largest deviation from the average latitude is the peak latitude error. Similarly, the instantaneous longitude coordinates $Long(t_4)$, $Long(t_5)$, $Long(t_6)$, $Long(t_7)$, and $Long(t_8)$ are compared with $Long\_Avg(t_8)$, and the largest deviation from the average longitude is the peak longitude error. As an illustration, consider the time window 916 ending in time period $t_{12}$, in FIG. 9. The value of $Lat\_Avg(t_{12})$ is represented by the line 910. The largest deviation from line 910 is the instantaneous latitude $Lat(t_{10})$ represented at point 914. Thus the peak error $Error\_Lat(t_{12})$ during time window 916 is represented as the distance 912 between $Lat(t_{10})$ 914 and $Lat\_Avg(t_{12})$ 910.

The GPS receiver/processor 125 uses the error values of $Error\_Lat(t_n)$ and $Error\_Long(t_n)$ to store the last reliable coordinates in the storage registers as follows. These storage registers may be memory location in the GPS receiver/processor. Alternatively, these storage registers may be memory locations in a separate memory unit which is accessible by the GPS receiver/processor 125. At each time interval $t_n$, the GPS receiver/processor 125 compares the peak error values $Error\_Lat(t_n)$ and $Error\_Long(t_n)$ with programmed error thresholds Err_Thresh_Lat and Err_Thresh_Long. As with the programmable sliding time window, these thresholds can vary depending on the desired accuracy and/or particular application. These thresholds are defined such that if the peak error values $Error\_Lat(t_n)$ and $Error\_Long(t_n)$ are within the thresholds Err_Thresh_Lat and Err_Thresh_Long respectively, then it can be assumed that the instantaneous coordinate values $Lat(t_n)$ and $Long(t_n)$ are within acceptable reliability limits. At each time period $t_n$, if the peak errors of both the latitude and longitude are within the threshold values, then the instantaneous coordinate values are stored in memory registers Lat_reg and Long_reg respectively. If the peak errors for either the latitude and longitude are not within the threshold values, then the instantaneous coordinate values $Lat(t_n)$ and $Long(t_n)$ are not stored in memory registers Lat_reg and Long_reg respectively. This technique assures that the memory registers Lat_reg and Long_reg contain recent reliable latitude and longitude coordinates.

In addition to the information sent by the mobile telephone 120 described above, the following GPS information is sent over the air interface 202 to the mobile telephone system 200 during each time period $t_n$:

$Lat(t_n)$ and $Long(t_n)$;

Lat_reg and Long_reg;

$Error\_Lat(t_n)$ and $Error\_Long(t_n)$; and

Err_Thresh_Lat and Err_Thresh_Long.

The MSC 220 operates as described above to initiate the location function of the MLM 230 under certain conditions. The algorithm 238 stored in memory 234 of MLM 230 instructs the processor 232 to operate as described below in conjunction with FIG. 10. Thus, upon initiation of the location function, the MLM 230 operates according to the flow diagram of FIG. 10 to calculate the location of the mobile telephone 120.

Figure 10:
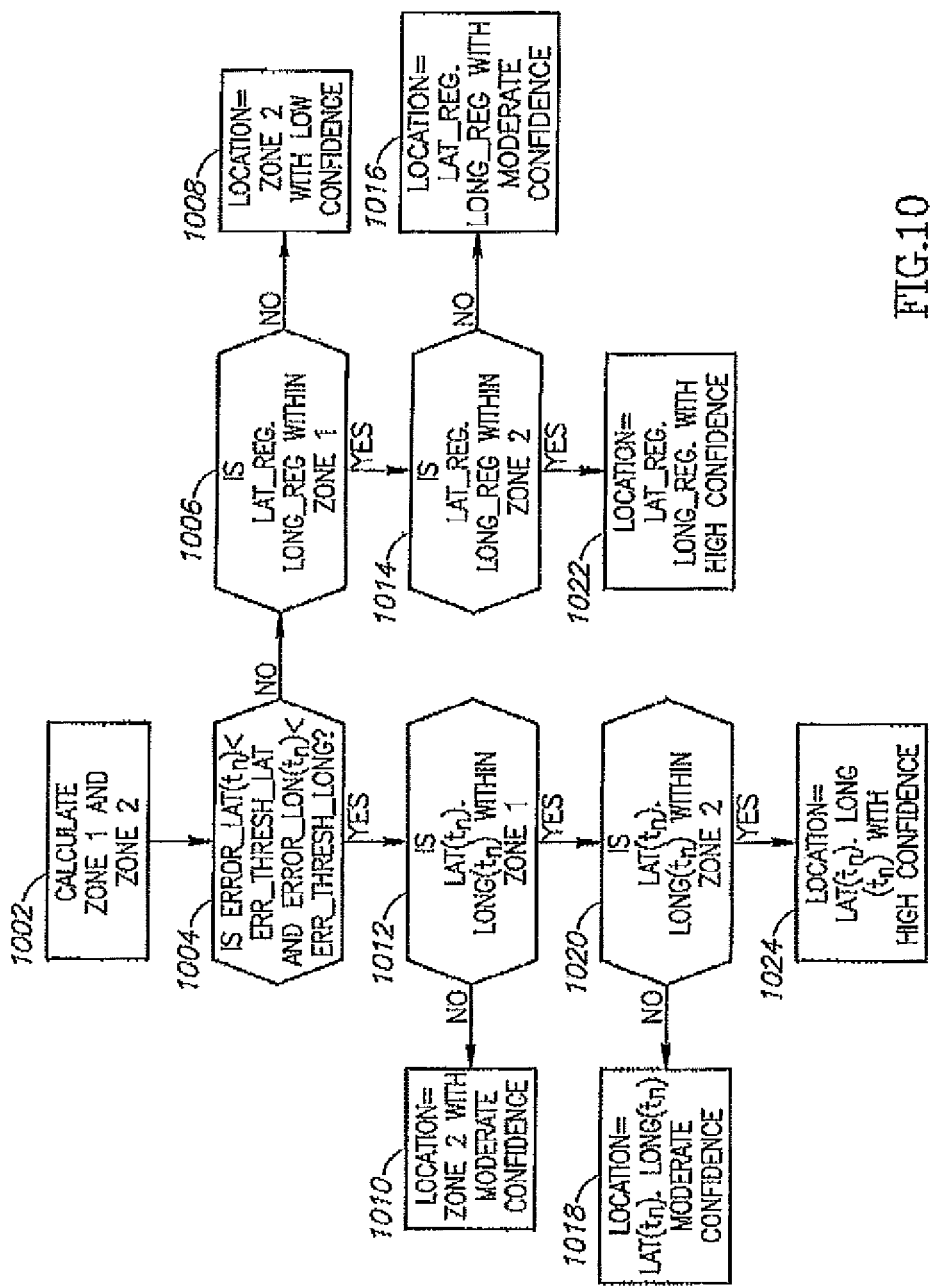
FIG. 10 is a block diagram of a method of calculating a location of a mobile station.

As discussed above, zone 1 is defined by the geographic coverage area of the cell currently serving the mobile telephone 120 and zone 2 is the location area calculated by the MLM 230 as described above in conjunction with FIGS. 4-8. Zone 1 will generally define an area larger than zone 2. Referring to FIG. 10, in step 1004 the MLM 230 determines if the peak latitude and longitude error values for the current time window are within the predetermined threshold error values. If they are, then the instantaneous latitude and longitude coordinates $Lat(t_n)$ and $Long(t_n)$ are considered to be of acceptable accuracy and they are used for further processing in step 1012. In step 1012 it is determined whether the instantaneous GPS coordinates define a location which is within zone 1. If not, then the MLM 230 returns the zone 2 location estimate with a moderate confident level in step 1010. If step 1012 determined that the instantaneous GPS coordinates define a location which is within zone 1, then in step 1020 it is determined whether the instantaneous GPS coordinates define a location which is within zone 2. If they do, then the MLM 230 returns the instantaneous coordinates as the location estimate with a high confidence level in step 1024. If the instantaneous GPS coordinates do not define a location which is within zone 2, then the MLM 230 returns the instantaneous coordinates as the location estimate with a moderate confidence level in step 1018.

If in step 1004 the MLM 230 determines that the peak latitude and longitude error values for the current time window are not within the predetermined threshold error values, then the instantaneous latitude and longitude coordinates $Lat(t_n)$ and $Long(t_n)$ are considered not to be of acceptable accuracy, and the latitude and longitude values stored in the memory registers Lat_reg and Long_reg are used for further processing in step 1006. In step 1006 it is determined whether the GPS coordinates stored in the memory registers define a location which is within zone 1. If not, then the MLM 230 returns the zone 2 location estimate with a low confidence level in step 1008. If the GPS coordinates stored in the memory registers define a location which is within zone 1, then in step 1014 it is determined whether the GPS coordinates stored in the memory registers define a location which is within zone 2. If not, then the MLM 230 returns the memory register coordinates as the location estimate with a moderate confidence level in step 1016. If the GPS coordinates stored in the memory register define a location which is within zone 2, then the MLM 230 returns the memory register coordinates as the location estimate with a high confidence level in step 1022.

Once the geographic location area is determined, the MLM 230 routes the information to the appropriate end user destination. The appropriate routing information 240, in one embodiment, is stored in memory 234 of the MLM 230. For example, if the location function was initiated because of a 911 call from the mobile telephone 120, the MLM 230 will route the location information to the appropriate public service provider. If the location function was initiated because the MSC 220 determined that the cellular telephone number belonged to a fleet company, the location information would be sent to the appropriate fleet company. Further, the location information could be communicated to the mobile telephone 120 itself if the request for location information came from the user of the mobile telephone 120.

Figure 11:
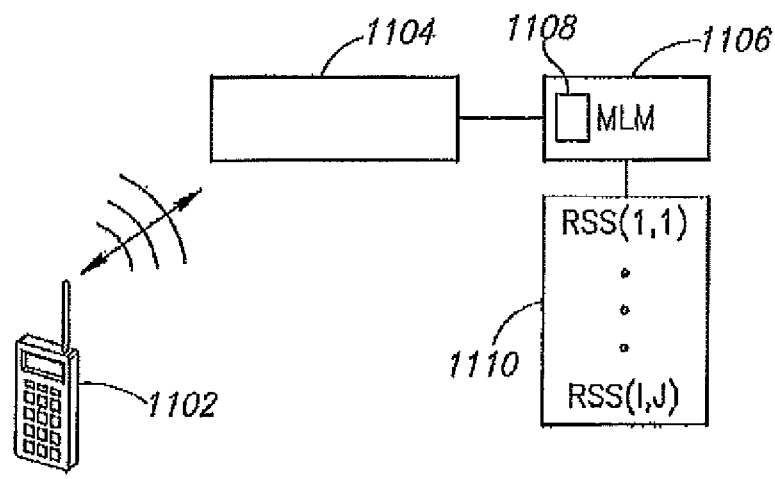
FIG. 11 is a schematic block diagram of a wireless communication system.

Power levels obtained by a mobile station and used in MAHO, or other sets of received signal strengths, power levels, or communication parameters can be used to locate a mobile station based on power contours or other predetermined power levels associated with an arrangement of cells. For example, as shown in FIG. 11, a mobile station 1102 transmits a set of received signal Strength (RSS) values such as those illustrated in FIG. 2 to a network 1104 configured to deliver the reported RSS values to a mobile location module (MLM) 1106. The mobile location module 1106 includes a processor 1108 configured to receive the set of RSS values and identify a mobile station location based on sets of RSS values associated with a plurality of locations in a coverage area. As shown in FIG. 11, the sets of RSS values are stored in a database 1110. Typically the MLM 1106 is associated with a base station and the database 1110 includes sets of characteristic or predetermined RSS values associated the geographic area served by a particular base station. While cells are shown as contiguous and non-overlapping in FIG. 1, networks can include overlapping cells or geographic gaps between cells. Databases associated with several cells can include similar predetermined RSS values.

Figure 12:
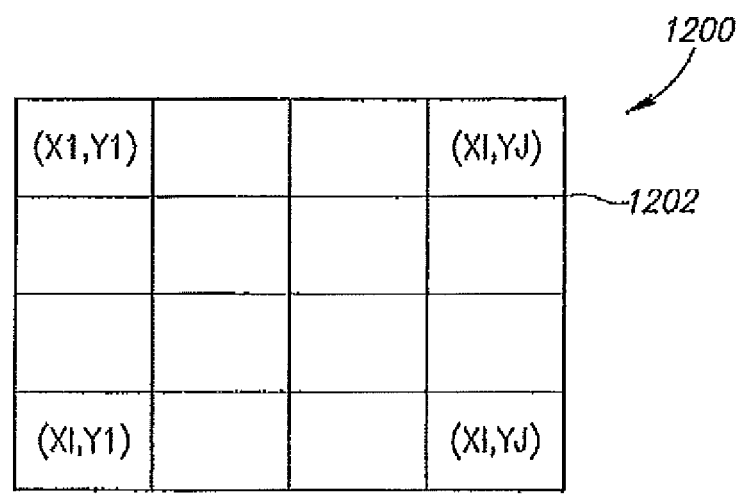
FIG. 12 is a schematic diagram of a division of a geographical service area into zones.

In a representative example, a network service area 1200 or a portion of a network service area such as a cell is divided into a service grid 1202 as shown in FIG. 12. The service grid 1202 is associated with a rectangular array of zones $Z_{IJ}$ corresponding to coordinates $(X_I, Y_J)$, respectively, where 1, J are integers associated with a number of rows and a number of columns, respectively. For convenience, a division into 16 rectangular zones is illustrated in FIG. 12, but a service area can be divided into fewer or more zones. Zones can be associated with a service area of one or more cells, or an entire network service area can be divided into a single set of zones. Zones can also be established based on nonrectangular grids such as triangular, square, hexagonal, curved, or other grids. In addition, the division can include a variety of regular and irregular shapes. The service area divisions can have different areas as well.

A mobile station location estimate can be obtained based on predetermined sets {RSS} of received signal strengths RSS by identifying a zone for which the reported RSS values match a set of RSS values associated with the zone. Matching can be determined based on computation of, for example, a sum of mean square differences between the reported RSS values (or some of these values) and the predetermined, stored zonal RSS values. While a mobile station typically reports several RSS values, zone matching can be based on computations using only selected RSS values. After a zone is selected, coordinates associated with the zone are provided as an estimate of mobile station location. Zone dimensions can be used to provide a location error estimate.

Figures 13, 14:
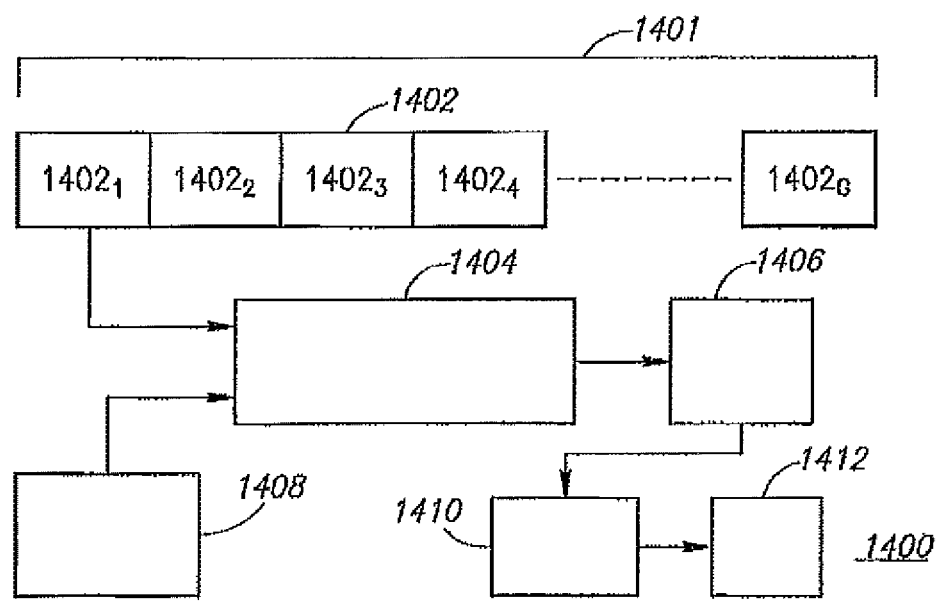
FIG. 13 is a schematic diagram of an alternative division of a geographical service area into zones.
FIG. 14 is a schematic block diagram of a mobile station location module.

Another representative division of a network service area or a cell service area is illustrated in FIG. 13. Zones 1301-1316 are associated with perimeter coordinates (X,Y) that correspond to zone corners in the example of FIG. 13. For example, the zone 1301 is associated with perimeter coordinates (X1,Y1), (X2,Y1), (X1,Y2), and (X2,Y2) that correspond to sets {RSS(1,1)}, {RSS (2,1)}, {RSS(1,2)}, and {RSS(2,2)} of received signal strength values, respectively. A mobile station location estimate can be identified based on RSS values reported by a mobile station (reported RSS values, or RSS(mobile)). If a zone area is unacceptably large for a predetermined positional accuracy in a mobile station location estimate, mobile station location can be based on interpolation using the sets {RSS} of predetermined RSS values associated with one or more zones.

The mobile location module 1106 processes the set of reported received signal strengths {RSS(mobile)} to provide an estimate of mobile station location by associating the set {RSS(mobile)} with one or more of the sets {RSS} of received signal strengths in the database 1110. An estimate of mobile station location corresponds to coordinates associated with the selected set of stored RSS values.

In an example, a mobile station location is estimated as described above based on, for example, triangulation using three RSS values. The triangulation procedure, with or with additional error corrections such as that described above, can be used to establish an initial mobile station location estimate (Xest, Yest). The mobile location module 1106 then compares reported RSS values with sets of RSS values associated with a grid such as the grids 1200, 1300, or with RSS values at one or more locations in a geographical area near the initial mobile station location estimate (Xext,Yest). Typically, these RSS values are stored in a database such as the database 1110 of FIG. 11. Based on the predetermined sets {RSS}, a second mobile location estimate is obtained.

With reference to FIG. 14, a mobile location module 1400 includes a database 1401 configured to store sets of RSS values associated with grid locations $1402_1, \ldots, 1402_G$. A processor 1404 is in communication with the database 1401 and is configured to receive data such as mobile-assisted hand-off data, typically a set of RSS values that are reported by a mobile station. The processor 1404 computes a score for all or selected RSS sets from the database 1401 based on the reported RSS values. The score values can be configured so that high values are associated with RSS values that do not correspond to a selected location while low scores indicate that the reported RSS values are similar to values of a selected location, or the score values can be otherwise configured. In a particular example, four grid locations associated with favorable score values are selected and stored in a memory 1406 and these grid values are communicated to an interpolator 1410 that provides interpolated location values at an output 1412. Typically, interpolation and score computation are produced with a microprocessor, workstation, an embedded processor, or special purpose processing hardware and software, so that the processor 1404 and the interpolator 1410 can be provided in the same hardware.

In some examples, a first mobile location estimate is based on the stored sets of RSS values and triangulation based estimation is not used, or triangulation based estimation is used in conjunction with RSS values. Alternatively, a GPS system associated with the mobile station can be used to establish a first mobile location estimate (Xest, Yest) and stored sets of RSS values are used to produce a second mobile location estimate.

In other examples, a mobile location estimate is based on the sets of RSS values, and GPS, triangulation, or other methods are used to produce a second estimate based on the first estimate. As noted above, the sets {RSS} can include two or more power levels and typically include six or more RSS values, and mobile location estimates can be based on one or more of the RSS values while some RSS values are not used.

Comparison of reported RSS values with stored sets of RSS values in a database can be performed based on, for example, evaluation of a sum of squares of differences between the reported RSS values and stored RSS values associated with one or more geographical locations. Typically, one or more geographical locations (X,Y) associated with a minimum or a relatively small sums of squares are selected as mobile station location estimates. If more than one location is selected, additional methods such as triangulation based methods can be used to select among multiple location estimates. Alternatively, GPS based locations can be used to select a likely mobile station location. Although it is unlikely that a single estimate cannot be extracted from multiple location estimates, more than one mobile station location estimate can be reported to an emergency responder or other recipient.

Figure 15:
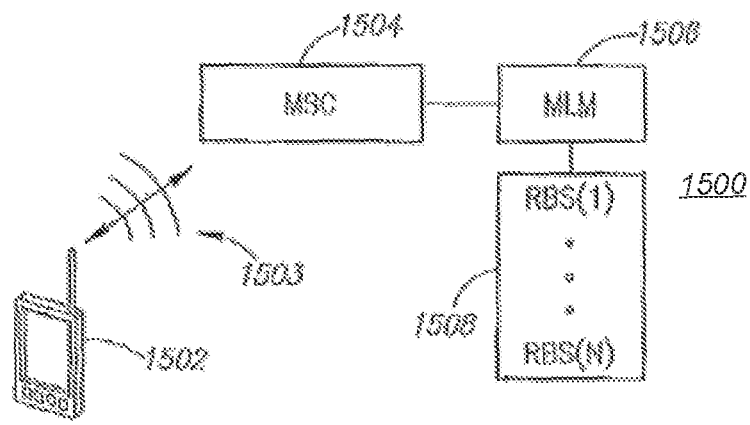
FIG. 15 is a schematic block diagram of a wireless network that includes a mobile station location module.

According to some examples, mobile station locations are established by the a mobile network location module based on one or more series of received signal strength (RSS) contours obtained by, for example, measurements of received signal strength or calculated received signal strengths. With reference to FIG. 15, a wireless communication system 1500 includes a mobile station 1502 such a portable digital assistant or other mobile device that communicates via an air interface 1503 with a mobile switching center (MSC) 1504. The MSC 1504 is in communication with a mobile network location module (MLM) 1506 that is configured to estimate a mobile station location based on received signal strength (RSS) contours associated with radio base stations. The contours can be stored in a database 1508 as values RBS(1) . . . RBS(N) corresponding to respective radio base stations, wherein N is a number of radio base stations.

Figure 16:
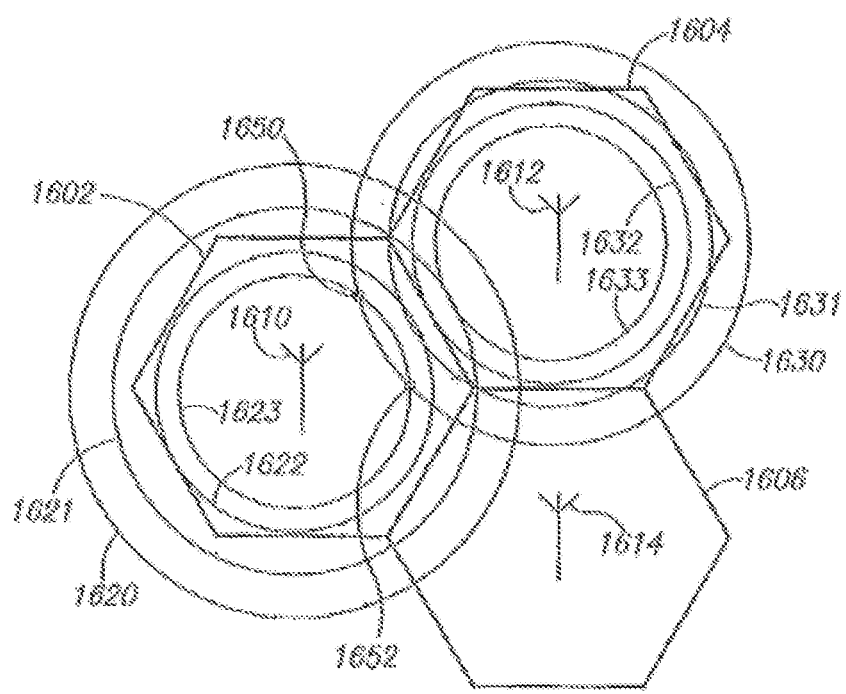
FIG. 16 is a schematic diagram illustrating received signal strength contours based on received signal strength values associated with cells of a wireless network.

FIG. 16 illustrates representative cells 1602, 1604, 1606 and associated radio base stations (RBS) 1610, 1612, 1614, respectively. Received signal strength (RSS) contours 1620-1623 and 1630-1633 that are associated with, for example, cells 1602, 1604 are shown. In general, additional contours associated with other RSS values (i.e., additional radio base stations) are used but these contours are not shown in FIG. 16. The contours 1620-1623 and 1630-1633 are associated with locations for which received power levels from respective radio base stations are approximately equal. In an example, the mobile station is in communication via the cell 1602 (RBS 1610) and reports a received signal strength from RBS 1610 that is associated with the contour 1623. The mobile location module selects geographical locations associated with the contour 1623 as possible locations of the mobile station. Because the mobile station 1604 reports a set of RSS values, additional power contours associated with additional radio base stations can be used to locate the mobile station. For example, the mobile station reports an RSS value associated with the radio base station 1612. As an example, if this RSS value can be associated with the contour 1630, the mobile station location estimate can be improved and an estimated location is associated with regions 1650, 1652. This procedure can be repeated for additional RSS values and an estimated mobile station location can be reported based on the identified contours.

Contour spacing can be set based on an acceptable spatial resolution so that associating one or more contours with associated reported RSS values permits a mobile location estimate to have a predetermined spatial resolution. Alternatively, interpolation or other method can be used to increase spatial resolution and establish mobile locations between contours.

Mobile station location estimates based on received signal strength contours can be enhanced or verified using triangulation based methods, GPS based methods, or RSS pattern based methods. Typically the set of RSS values includes six or more received signal strength values but only one or more of these values can be used to establish a mobile location. In some examples, identification of a contour based on a first RSS value is used to establish a range of locations. In addition, a received voice power level RSSV can be reported by the mobile station and used in preparation of mobile station location estimates in this or other methods.

While computation of an error score associated with a comparison of reported RSS values with predetermined sets of measured or calculated RSS values can be used to estimate mobile station location, such estimates can also be prepared based on signal strength patterns. For example, ratios of the reported RSS values can be compared with ratios of the predetermined RSS values. Alternatively, the predetermined RSS values and the set of reported RSS values can be correlated to identify a set of predetermined RSS values similar to the reported RSS values, and an associated location provided as a mobile station location estimate. Other pattern recognition methods can also be used.

Figure 17:
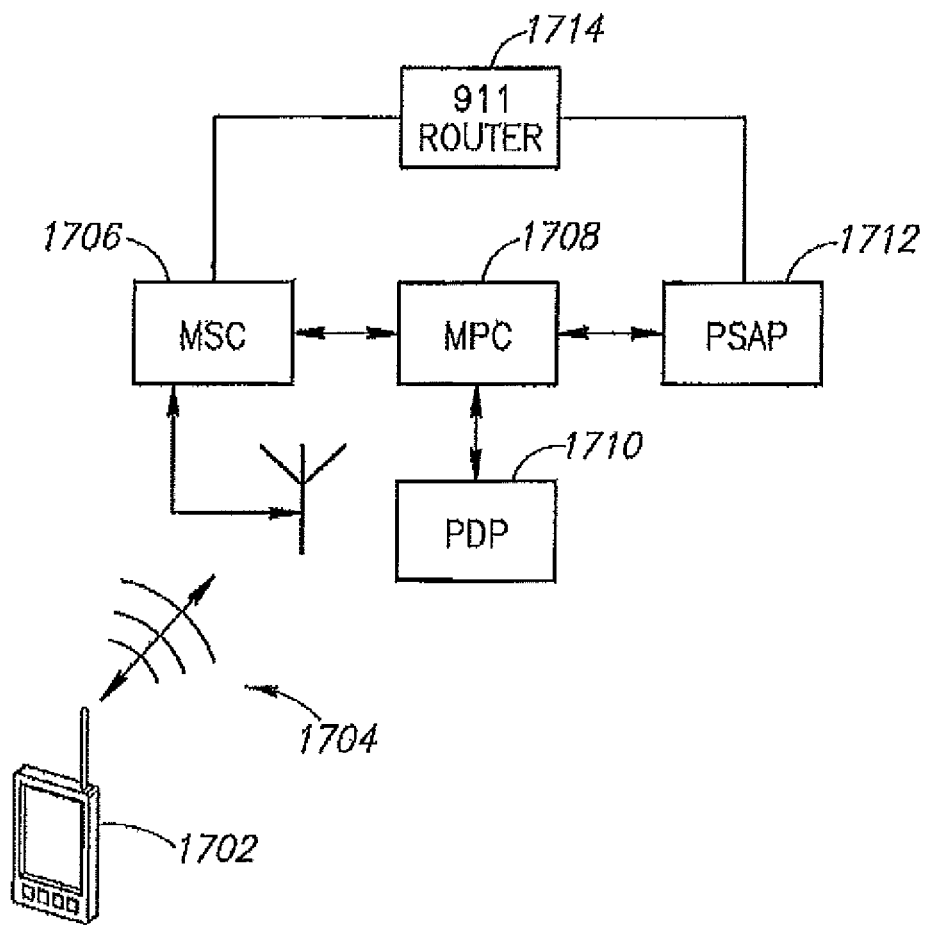
FIG. 17 is a schematic block diagram illustrating a wireless network configured to provide mobile station locations to an emergency services provider.

FIG. 17 illustrates emergency services provided by a wireless network that is configured to report mobile station locations. A mobile station 1702, such as a cell phone, PDA, or other mobile or portable device voice, data, or voice/data device, reports one or more received signal strength values to a mobile switching center (MSC) 1706 using an air interface 1704. The mobile switching center 1706 delivers the reported RSS values to a mobile positioning center (MPC) 1708 that is in communication with a position determining processor (PDP) 1710. The mobile positioning center 1708 is also in communication with a public-safety answering point (PSAP) 1712 that is configured to communicate with an emergency services (911-selective) router 1714. The MSC 1706 is also in communication with the 911-selective router 1714.

In operation, the mobile station 1702 initiates an emergency services (911) request that is communicated via the air interface 1704 to the MSC 1706. The MSC 1706 sends a message to the MPC 1708 indicating that a 911 call has been placed and that the MSC 1706 is configured for mobile location services. The MPC 1708 returns routing instructions to the MSC 1706 so that the call is routed to the PSAP 1712 via the 911-selective router 1714. The MPC 1708 queries the MSC 1706 for RSS values and requests that the mobile station 1702 report RSS values. The MSC 1706 forwards reported RSS values to the MPC 1708 and the PDP 1710 delivers a mobile location estimate to the MPC 1708. The PSAP 1712 queries the MPC 1708 for the mobile location that is communicated by the MPC 1708. As the emergency services request continues, additional requests for mobile location can be serviced so that movement of the requester can be traced. Based on these additional location estimates, other information such as direction of travel can be obtained.

While determining a location of a cell phone in a wireless network is important for providing emergency services based on an emergency services number such as 911 service, mobile location estimates can be included in other applications such as identification of a mobile location with respect to other users of a mobile network or determination of user location with respect to services such as dining, shopping, accommodations, entertainment, transportation, or other services. Such locations can be established without reference to dedicated positioning systems such as GPS and GPS hardware is unnecessary. Because GPS signals are relatively weak, location determination based on MAHO parameters permits location determination even in indoor or covered areas in which GPS signal reception is difficult or impossible. However, GPS can be used in association with MAHO based methods.

Location determination can also be similarly implemented in other networks that include mobile-assisted handoff. For example, wireless networks based on so-called BLUETOOTH technology, or on IEEE 802.11, can be configured so that mobile devices report received signal strengths. In addition, wireless networks using TDMA, CDMA, FDMA, or other protocols can be configured to implement mobile-assisted location services. Such networks can include control channels, voice channels, data channels, or other communication channels, and reported power levels in any of these channels can be used in mobile location.

Mobile station location methods and apparatus are described above with reference to selected communication standards, but in other examples additional systems are used. For example, systems based on the Global System for Mobile Communication (GSM), IS-95, IS-54, General Packet Radio Service (GPRS), the Digital Cordless European Telecommunication (DECT) service, or Cellular Digital Packet Data (CDPD) service, GERAN (GSM/EDGE) service, or combinations thereof can be provided. Location methods and apparatus can be configured for systems that provide wide area voice coverage, local voice coverage, wide area data services, local area data services, or combinations thereof.

Representative examples of handoff are described above with reference to handoff in voice networks based on base stations. In general, a connection between a mobile or portable device and a network is made at so-called points of attachment. In cellular telephone networks, base stations generally serve as points of attachment while in wireless local area networks (WLANs), so-called access points serve as points of attachment. In some examples, a mobile device can connect to a network with base stations or access points. Received signal strength (RSS) values can be associated with network points of attachment, but other parameters such as path loss, symbol error rate, bit error rate, signal-to-interference ratio, carrier-to-interference ratio, block error rate, or other parameters can be used. For convenience, such parameters are referred to as attachment indicators.

In wireless networks in which a mobile station reports power levels periodically, mobile station location can be updated or tracked while voice or data communication is in progress, without interrupting communications. Accordingly, the movement of a mobile station can be tracked which can be especially important in supplying emergency services. In some TDMA systems, such received power levels are reported as often as once per second.

Signal strength contours and/or grids can be established in several ways. Because sophisticated radio frequency (RF) design software is available, RSS or other characteristic attachment indicator values can be calculated as a function of location of with spatial grids having dimensions of 50 m or less. A number of RF factors can be used in such a calculation including antenna height, antenna type, downtilt, beam width, effective radiated power, and ground clutter. Such computations can include consideration of geographical factors such as surface topography and other factors. Such computed RSS values can be confirmed by field measurements and deficiencies in predicted values can be corrected or compensation based on field measurements. Alternatively, RSS values can be based on a series of measurements obtained by, for example, driving a vehicle in the geographical service area and recording RSS values. In other alternatives, some values are predicted based using RF design software while other values are measured. In addition, as RSS values are reported in association with actual GPS values, contour or grid values can be revised based on these measurements during network use, without use of dedicated hardware or additional support personnel.

Methods and apparatus are described above with reference to received signal strengths associated with one or more points of attachment to a network. In other examples, error rates, propagation delays, or other parameters can be associated with points of attachment and used to estimate locations. In addition, estimates are typically based on comparisons with signal strengths associated with three or more points of attachment, but in some examples, signal strengths associated with two points of attachment can be used. In some examples, attachment indicator values associated with attachment points are calculated or measured and stored in database. In other examples, appropriate attachment indicator values are established as needed by, for example, computation based on propagation characteristics or interpolation based on stored values. Attachment indicator values associated with geographical locations can be referred to as characteristic attachment indicator values and such values can be stored, calculated, or measured.

Because mobile station location can be based on RSS values that are reported during normal network operation, such location methods tend to be reliable. In addition, any network failure that would impair mobile station location estimation is associated with other networks errors in routine network use so that such failures tend to be detected promptly. Other advantages of RSS level based mobile location determination is that the mobile station need not be a network subscriber, because RSS level reporting can be performed by non-subscribers. Thus, emergency services such as 911 calling are available to non-subscribers or to mobile stations that are not initialized, or that have no associated phone number.

Characteristic values associated with a network or a portion of a network can be stored in a memory. As used herein, memory includes random access memory (RAM), read-only memory (ROM), hard disks, floppy disks, magnetic tape, and other storage media.

Examples are described above with reference to representative mobile devices and wireless networks. These examples are illustrative, and these examples can be modified in arrangement and detail. We claim all that is encompassed by the appended claims.

What is claimed is:

1. A method comprising:
   defining, by a mobile location apparatus comprising a processor, a first location zone based, at least in part, on a geographic coverage area of a cell serving a mobile communication device;
   determining, by the mobile location apparatus, a second location zone associated with the mobile communication device, wherein the second location zone is determined based, at least in part, on a corresponding strength of signal associated with each of a plurality of cells measured by the mobile communication device, wherein the corresponding strength of signal associated with each of the plurality of cells measured by the mobile communication device is used to calculate a corresponding distance between the mobile communication device and a respective base station of each of the plurality of cells, and wherein the corresponding distance between the mobile communication device and the respective base station of each of the plurality of cells is used to determine the second location zone associated with the mobile communication device;
   receiving, by the mobile location apparatus, from the mobile communication device, first coordinates of the mobile communication device calculated, at a first time period, by a global positioning system of the mobile communication device;
   determining, by the mobile location apparatus, whether the first coordinates of the mobile communication device are within the first location zone;
   in response to determining that the first coordinates of the mobile communication device are within the first location zone, determining, by the mobile location apparatus, whether the first coordinates of the mobile communication device are within the second location zone; and
   in response to determining that the first coordinates of the mobile communication device are within the second location zone, associating, by the mobile location apparatus, the first coordinates of the mobile communication device with a high confidence level as being an estimate of a geographical location of the mobile communication device.

2. The method of claim 1, further comprising providing, by the mobile location apparatus, the estimate of the geographical location of the mobile communication device to an emergency responder.

3. The method of claim 1, further comprising providing, by the mobile location apparatus, the estimate of the geographical location of the mobile communication device to the mobile communication device for use with a mobile-assisted location service.

4. The method of claim 1, further comprising receiving, by the mobile location apparatus, from the mobile communication device:
   second coordinates calculated, at a second time period before the first time period, by the global positioning system of the mobile communication device;
   error threshold values; and
   peak error values associated with a plurality of coordinates of the mobile communication device calculated, over a plurality of time periods including the first time period, by the global positioning system of the mobile communication device, wherein the plurality of coordinates include the first coordinates.

5. The method of claim 4, further comprising:
   determining whether the peak error values associated with the plurality of coordinates of the mobile communication device are within the error threshold values;
   in response to determining that the peak error values associated with the plurality of coordinates of the mobile communication device are within the error threshold values, then using the first coordinates to determine the estimate of the geographical location of the mobile communication device; and
   in response to determining that the peak error values associated with the plurality of coordinates of the mobile communication device are not within the error threshold values, then using the second coordinates to determine the estimate of the geographical location of the mobile communication device.

6. A mobile location apparatus comprising:
   a processor; and
   a memory that stores instructions that, when executed by the processor, cause the processor to perform operations comprising
      defining a first location zone based, at least in part, on a geographic coverage area of a cell serving a mobile communication device,
      determining a second location zone associated with the mobile communication device, wherein the second location zone is determined based, at least in part, on a corresponding strength of signal associated with each of a plurality of cells measured by the mobile communication device, wherein the corresponding strength of signal associated with each of the plurality of cells measured by the mobile communication device is used to calculate a corresponding distance between the mobile communication device and a respective base station of each of the plurality of cells, and wherein the corresponding distance between the mobile communication device and the respective base station of each of the plurality of cells is used to determine the second location zone associated with the mobile communication device, receiving, from the mobile communication device, first coordinates of the mobile communication device calculated, at a first time period, by a global positioning system of the mobile communication device, determining whether the first coordinates of the mobile communication device are within the first location zone, in response to determining that the first coordinates of the mobile communication device are within the first location zone, determining whether the first coordinates of the mobile communication device are within the second location zone, and in response to determining that the first coordinates of the mobile communication device are within the second location zone, associating the first coordinates of the mobile communication device with a high confidence level as being an estimate of a geographical location of the mobile communication device.

7. The mobile location apparatus of claim 6, wherein the operations further comprise providing the estimate of the geographical location of the mobile communication device to an emergency responder.

8. The mobile location apparatus of claim 6, wherein the operations further comprise providing the estimate of the geographical location of the mobile communication device to the mobile communication device for use with a mobile-assisted location service.

9. The mobile location apparatus of claim 6, wherein the operations further comprise receiving, from the mobile communication device:

second coordinates calculated, at a second time period before the first time period, by the global positioning system of the mobile communication device;

error threshold values; and peak error values associated with a plurality of coordinates of the mobile communication device calculated, over a plurality of time periods including the first time period, by the global positioning system of the mobile communication device, wherein the plurality of coordinates include the first coordinates.

10. The mobile location apparatus of claim 9, wherein the operations further comprise:

determining whether the peak error values associated with the plurality of coordinates of the mobile communication device are within the error threshold values;

in response to determining that the peak error values associated with the plurality of coordinates of the mobile communication device are within the error threshold values, then using the first coordinates to determine the estimate of the geographical location of the mobile communication device; and in response to determining that the peak error values associated with the plurality of coordinates of the mobile communication device are not within the error threshold values, then using the second coordinates to determine the estimate of the geographical location of the mobile communication device.

11. A non-transitory computer readable medium storing instructions that, when executed by a processor of a mobile location apparatus, cause the processor to perform operations comprising:

defining a first location zone based, at least in part, on a geographic coverage area of a cell serving a mobile communication device;

determining a second location zone associated with the mobile communication device, wherein the second location zone is determined based, at least in part, on a corresponding strength of signal associated with each of a plurality of cells measured by the mobile communication device, wherein the corresponding strength of signal associated with each of the plurality of cells measured by the mobile communication device is used to calculate a corresponding distance between the mobile communication device and a respective base station of each of the plurality of cells, and wherein the corresponding distance between the mobile communication device and the respective base station of each of the plurality of cells is used to determine the second location zone associated with the mobile communication device;

receiving, from the mobile communication device, first coordinates of the mobile communication device calculated, at a first time period, by a global positioning system of the mobile communication device;

determining whether the first coordinates of the mobile communication device are within the first location zone;

in response to determining that the first coordinates of the mobile communication device are within the first location zone, determining whether the first coordinates of the mobile communication device are within the second location zone; and in response to determining that the first coordinates of the mobile communication device are within the second location zone, associating the first coordinates of the mobile communication device with a high confidence level as being an estimate of a geographical location of the mobile communication device.

12. The non-transitory computer readable medium of claim 11, wherein the operations further comprise providing the estimate of the geographical location of the mobile communication device to the mobile communication device for use with a mobile-assisted location service.

13. The non-transitory computer readable medium of claim 11, wherein the operations further comprise receiving, from the mobile communication device:

second coordinates calculated, at a second time period before the first time period, by the global positioning system of the mobile communication device;

error threshold values; and peak error values associated with a plurality of coordinates of the mobile communication device calculated, over a plurality of time periods including the first time period, by the global positioning system of the mobile communication device, wherein the plurality of coordinates include the first coordinates.

14. The non-transitory computer readable medium of claim 13, wherein the operations further comprise:

determining whether the peak error values associated with the plurality of coordinates of the mobile communication device are within the error threshold values;

in response to determining that the peak error values associated with the plurality of coordinates of the mobile communication device are within the error threshold values, then using the first coordinates to determine the estimate of the geographical location of the mobile communication device; and in response to determining that the peak error values associated with the plurality of coordinates of the mobile communication device are not within the error threshold values, then using the second coordinates to determine the estimate of the geographical location of the mobile communication device.

\* \* \* \* \*